United States Patent
Hamamoto et al.

(10) Patent No.: US 6,622,151 B1
(45) Date of Patent: Sep. 16, 2003

(54) DATA-TRANSFER-MANAGEMENT SYSTEM AND TRANSFER HISTORY-COLLECTION DEVICE

(75) Inventors: Yuka Hamamoto, Kobe (JP); Toru Yoshikuni, Kobe (JP); Shigeyuki Dambayashi, Kobe (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/559,256

(22) Filed: Apr. 27, 2000

(30) Foreign Application Priority Data

Apr. 28, 1999 (JP) .......................... 11-122185
Feb. 18, 2000 (JP) ...................... 2000-042060

(51) Int. Cl.$^7$ ............................................. G06F 17/30
(52) U.S. Cl. ...................... 707/202; 707/205; 709/232
(58) Field of Search .................. 707/200, 202, 707/203, 204, 205; 709/217, 218, 220, 223, 224, 229, 225, 201, 232

(56) References Cited

U.S. PATENT DOCUMENTS

| | | | | |
|---|---|---|---|---|
| 4,935,869 A | * | 6/1990 | Yamamoto | 707/202 |
| 5,293,617 A | * | 3/1994 | Okada | 707/202 |
| 5,664,100 A | * | 9/1997 | Miura | 707/205 |
| 5,732,212 A | * | 3/1998 | Perholtz et al. | 709/224 |
| 5,987,575 A | * | 11/1999 | Yamaguchi | 707/203 |
| 6,085,239 A | * | 7/2000 | Kubo et al. | 709/223 |

OTHER PUBLICATIONS

Linington, Peter F., "File Transfer Protocols", IEEE Journal On Selected Areas in Communications, vol. 7, No. 7, Sep. 1989, pp. 1052–1059.*

* cited by examiner

Primary Examiner—Shahid Al Alam
(74) Attorney, Agent, or Firm—Staas & Halsey LLP

(57) ABSTRACT

A device for collecting history of data transfer includes a transfer-history-extraction unit which extracts transfer-history information from data subjected to data transfer, and a service-management unit which stores the transfer-history information together with a processing result indicative of either a proper completion of the data transfer or an improper completion of the data transfer.

21 Claims, 17 Drawing Sheets

FIG. 3

ITEMS FOR SERVICE SEARCH | ITEMS FOR FILE TRANSFER | STATUS

| | | ITEMS FOR IDENTIFYING SERVICE | | | ITEMS FOR FILE TRANSFER | | | PROCESSING RESULT | | |
|---|---|---|---|---|---|---|---|---|---|---|
| SERVICE ID | GROUP ID | NAME OF PARTNER SYSTEM | TYPE OF DATA EXCHANGE | NAME OF FILE IN PARTNER SYSTEM | NAME OF FILE IN ITS OWN SYSTEM | USER ID & PASSWORD OR SUCH | PROCESSING RESULT | TRANSFER-START TIME | TRANSFER-END TIME | DATA SIZE |
| TOKYO 01 | ZAIKO | TOKYO | SEND | ZAIKO. A | ZAIKO. A# | | COMP | 1999.4.2 13:10:52 | 1999.4.2 13:10:57 | 1820 |
| OSAKA 01 | URIAGE | OSAKA | RECEIVE | URIAGE. A | URIAGE. A# | | ERROR | 1999.4.3 14:20:23 | 1999.4.3 14:21:10 | 0 |
| TOKYO 02 | ZAIKO | TOKYO | SEND | ZAIKO. B | ZAIKO. B# | | ERROR | | | 0 |
| NAGOYA 05 | ZAIKO | NAGOYA | *SEND | ZAIKO. Z | ZAIKO. Z# | | INIT | | | 0 |
| TOKYO 05 | URIAGE | TOKYO | *RECEIVE | URIAGE. Z | URIAGE. Z# | | EXEC | 1999.4.8 21:06:01 | | 0 |

ONE SERVICE CORRESPONDS TO ONE RECORD

* INDICATES REQUEST FROM SYSTEM

ITEMS REGISTERED IN ADVANCE FOR SERVICE-MANAGEMENT PURPOSE

← THERE IS ALSO A WAITING STATUS

① SEARCH FOR SERVICES OF INITIAL STATUS

| GET STATUS (INIT) |

② SEARCH GROUP BY GROUP

| GET GRPID (ZAIKO) |

③ SEARCH SYSTEM BY SYSTEM

| GET NODE (TOKYO,NAGOYA) |

④ SEARCH BY USE OF FILE NAME

| GET FILE (URIAG*) |

↑
　　　　　　WILD CARD

⑤ SEARCH BY USE OF TYPE OF EXCHANGE

| GET KING (*SEND) |

FIG. 15A

AFTER FIRST TRANSFER

| SERVICE ID | GROUP ID | NAME OF PARTNER SYSTEM | TYPE OF DATA EXCHANGE | NAME OF FILE IN PARTNER SYSTEM | PRESENCE/ ABSENCE OF HALFWAY RETRANSMISSION | NAME OF FILE IN ITS OWN SYSTEM | USER ID & PASSWORD OR SUCH | PROCESSING RESULT | START TIME & END TIME | DATA SIZE | UNIT OF TRANSFER | NUMBER OF TRANSFERRED UNITS | FILE SIZE | DATA OF LAST UPDATE |
|---|---|---|---|---|---|---|---|---|---|---|---|---|---|---|
| OSAKA 01 | URIAGE | OSAKA | RECEIVE | URIAGE A | PRESENCE | URIAGE A# | | ERROR (RWAIT) | 1999.4.3 ... | 0 | 100 | 10 | 950 | 1999.4.3 14:21:06 |

FIG. 15B

AT START OF RETRANSMISSION

| OSAKA 01 | URIAGE | OSAKA | RECEIVE | URIAGE A | PRESENCE | URIAGE A# | | EXEC | 1999.4.3 | 0 | 100 | 10 | 950 | 1999.4.3 14:21:06 |

CHANGE TO EXEC

FIG. 15C

DURING SERVICE

| OSAKA 01 | URIAGE | OSAKA | RECEIVE | URIAGE A | PRESENCE | URIAGE A# | | EXEC | 1999.4.3 | 0 | 100 | 11 | 950 | 1999.4.3 14:21:06 |

UPDATE BY UNIT

FIG. 15D

AFTER SERVICE (PROPER COMPLETION)

| OSAKA 01 | URIAGE | OSAKA | RECEIVE | URIAGE A | PRESENCE | URIAGE A# | | COMP | 1999.4.3 ... | 1080 | — | — | — | — |

FIG. 15E (IMPROPER COMPLETION)

| OSAKA 01 | URIAGE | OSAKA | RECEIVE | URIAGE A | PRESENCE | URIAGE A# | | ERROR (RWAIT) | 1999.4.3 ... | 0 | 100 | 15 | 480 | 1999.4.3 15:10:05 |

UPDATE TO REFLECT STATUS AFTER TRANSFER

DATA-TRANSFER-MANAGEMENT SYSTEM AND TRANSFER HISTORY-COLLECTION DEVICE

BACKGROUND OF THE INVENTION

1. Field of the Invention

The present invention generally relates to a data-transfer-management system that manages and controls data transfers between a computer system and another computer system.

The present invention further relates to a data-transfer system that transfers data based on data-transfer history where the data-transfer history is managed and controlled by the data-transfer-management system.

The present invention further relates to a transfer-history-collection device that is used in the data-transfer system.

The present invention further relates to a record medium having a program embodied therein for performing processing to implement the data-transfer system and the transfer-history-collection device.

2. Description of the Related Art

Typically, sales data and orders for the following days are transmitted from a computer system of each store to a central computer system located at the headquarters immediately after the closing of the day. The central computer system displays or printouts listings of sales figures and order information, so that the manager can check items of the list one by one.

The manager at the headquarters checks the lists displayed or printed out by the central computer system, and finds missing information, if any, to learn which stores failed to report sales figures and order information. The manager calls such stores, and tells store managers that sales figures and order information have not been received, requesting transmission or retransmission of such data and information. The central computer system at the headquarters obtains total figures based on the sales data and order information collected from each store.

As described above, the manager at the headquarters who checks sales and orders is responsible for finding stores which have failed to report, and is also responsible for contacting store managers to request transmission or retransmission of sales figures and the like.

Accordingly, there is a need for a transfer-history-collection device which makes it easier to retransfer data with respect to data that was not transferred properly.

Further, there is a need for a record medium having a program embodied therein for causing a computer to perform operation of the transfer-history-collection device.

Further, there is a need for a data-transfer-management system which makes it easier to retransfer data with respect to data that was not transferred properly.

Further, there is a need for a record medium having a program embodied therein for causing a computer to perform operation of the data-transfer-management system.

Further, there is a need for a data-transfer system which makes it easier to retransfer data based on information controlled by the data-transfer-management system.

Further, there is a need for a record medium having a program embodied therein for causing a computer to perform operation of the data-transfer system.

SUMMARY OF THE INVENTION

It is a general object of the present invention to provide a device and a system that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a device and a system particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a device for collecting history of data transfer, including a transfer-history-extraction unit which extracts transfer-history information from data subjected to data transfer, and a service-management unit which stores the transfer-history information together with a processing result indicative of either a proper completion of the data transfer or an improper completion of the data transfer.

In the device as described above, the transfer-history information and the processing results are stored together, so that a data-transfer service having an improper completion status can be searched in the transfer-history information, and retransmission of the data can be attended to in response to the result of the search.

Further, the invention provides a system for managing history of data transfer, including a data-storage unit, a transfer-history obtaining unit which obtains transfer-history information each time a data transfer service is performed to transfer a file, the transfer-history information identifying the data-transfer service, and a service-management unit which stores, in said data-storage unit, the transfer-history information together with a processing result indicative of either a proper completion of the data-transfer service or an improper completion of the data-transfer service.

In the system as described above, the transfer-history information and the processing results are stored together for the purpose of managing data-transfer operations, so that a data-transfer service having an improper completion status can be searched in the transfer-history information, and retransmission of the data can be attended to in response to the result of the search.

BRIEF DESCRIPTION OF THE DRAWINGS

FIG. 3 is a table showing an example of a data format of a service-management-book unit of FIG. 1;

FIG. 8 is an example of a search in the service-management-book unit;

FIGS. 15A through 15E are tables showing the way of how entries of a service record are updated.

DESCRIPTION OF THE PREFERRED EMBODIMENTS

In the following, embodiments of the present invention will be described with reference to the accompanying drawings.

Figure 1:
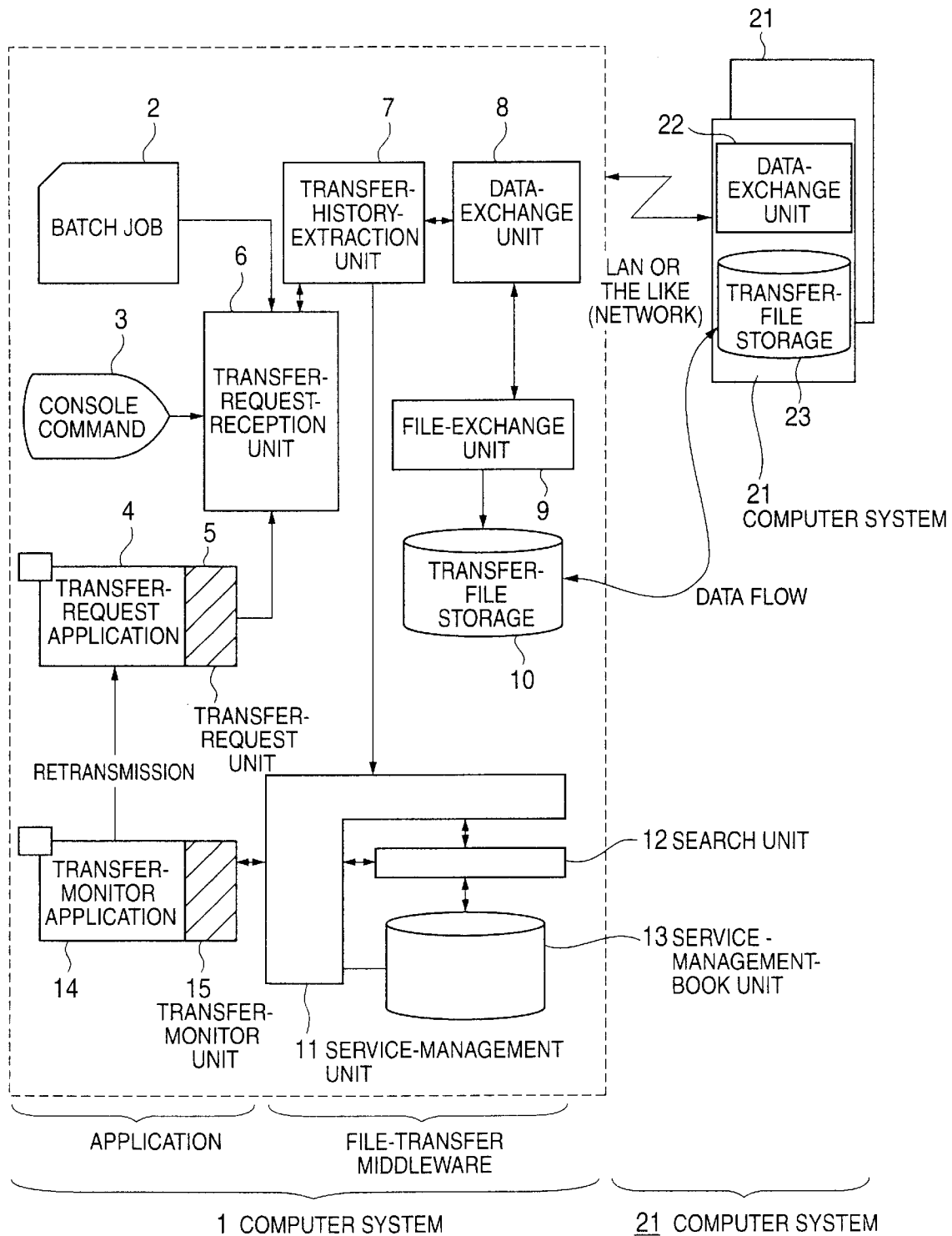
FIG. 1 is an illustrative drawing showing a configuration of a data-transfer-management system according to a first embodiment of the present invention.

FIG. 1 is an illustrative drawing showing a configuration of a data-transfer-management system according to a first embodiment of the present invention.

In FIG. 1, a computer system 1 installed at headquarter is connected to a computer system 21 installed at a store. The connection is provided by a network such as a public telephone network or a LAN (local area network). The computer system 1 is equipped with functions to manage and control data transfer with the computer system 21.

The computer system 1 includes a batch job 2, a console command 3, a transfer-request application 4, a transfer-request unit 5, a transfer-request-reception unit 6, a transfer-history-extraction unit 7, a data-exchange unit 8, a file-exchange unit 9, a transfer-file storage 10, a service-management unit 11, a search unit 12, a service-management-book unit 13, a transfer-monitor application 14, and a transfer-monitor unit 15.

The batch job 2 attends to batch-job processing according to provided programs. In this example, the batch job 2 may request the computer system 21 to transfer data, and may attend to various business processing such as sales processing, inventory management, etc., based on the data supplied from the computer system 21.

The console command 3 is a set of various commands that are entered by the manager. In this example, the console command 3 may be a command indicating a data search The transfer-request application 4 is an application program for requesting data transfer as it becomes necessary. The batch job 2, the console command 3, and the transfer-request application 4 issue an instruction to transfer data, and are selected by the user (manager).

The transfer-request unit 5 requests data transfer in accordance with a request from the transfer-request application 4. The transfer-request-reception unit 6 receives a request for data transfer from the batch job 2, the console command 3, or the transfer-request unit 5. The transfer-history-extraction unit 7 extracts transfer-history information from data that is received or that is to be transmitted. The transfer-history information includes a destination, a file name, a type of data exchange, etc. The transfer-history information will be described later in detail.

The data-exchange unit 8 exchanges data with the computer system 21. The file-exchange unit 9 exchanges files containing the data. The transfer-file storage 10 stores files in a predetermined file format where the files contain received data or data to be transmitted. The service-management unit 11 manages and controls the service-management-book unit 13, which includes the transfer-history information, business ID (group ID), transmission/reception records, etc.

The search unit 12 searches in the service-management-book unit 13, and outputs information obtained as a result of search. Details of the search unit 12 will be described later. The transfer-monitor unit 15 monitors data statuses such as a transmission/no-transmission status in accordance with the transfer-monitor application 14.

The transfer-monitor application 14 is an application program for monitoring data transfer. The details of the transfer-monitor application 14 will be described later in detail. The transfer-monitor unit 15 monitors data statuses of data to be transferred according to the transfer-monitor application 14.

The computer system 21 of each store connected to the computer system 1 installed at the headquarters includes a data-exchange unit 22 and transfer-file storage 23. The data-exchange unit 22 exchanges data with the computer system 1. The transfer-file storage 23 stores data in a predetermined file format where the data is received or is to be transmitted by the data-exchange unit 22.

In the configuration described above, basic operation of the system will be as follows.

The transfer-history-extraction unit 7 extracts transfer-history information from data received from the computer system 21, and the data-exchange unit 8 stores therein the received data. Processing results that are obtained at a time of completion of data transfer are stored together with the extracted transfer-history information.

Further, the transfer-history-extraction unit 7 extracts transfer-history information from the data received from the computer system 21, or extracts transfer-history information from data that is to be transmitted in response to a request from an application program of the computer system 1. The data-exchange unit 8 transfers the data to the computer system 21 or to the application program. Processing results that are extracted at a time of completion of data transfer is stored together with the transfer-history information.

If no transfer-history information is available, the transfer-history information is added to and registered in the service-management-book unit 13.

When a search command is entered by specifying a group ID or a business ID, the search unit 12 searches in the service-management-book unit 13 to output entries having the specified group ID or the specified business ID.

When a search command is entered by specifying a file name, the search unit 12 searches in the service-management-book unit 13, thereby outputting an entry having the specified file name.

When a search command is entered by specifying a processing result, the search unit 12 searches in the service-management-book unit 13 to output an entry having the specified processing result.

When a search result is not yet transmitted or is not yet received, a request for data retransmission is sent to an appropriate destination.

In this manner, history information (a destination name, a type of data exchange, a file name, and the like) about data that is exchanged with other parties is stored in the service-management-book unit 13 together with processing results, and a search is conducted in the service-management-book unit 13 according to specified conditions, thereby achieving efficient processing with respect to requesting of data retransmission, summarizing of data business type by business type, detecting of system conditions of the computer system 21, etc.

In the following, operations of the computer system 1 will be described in detail.

Figure 2A:
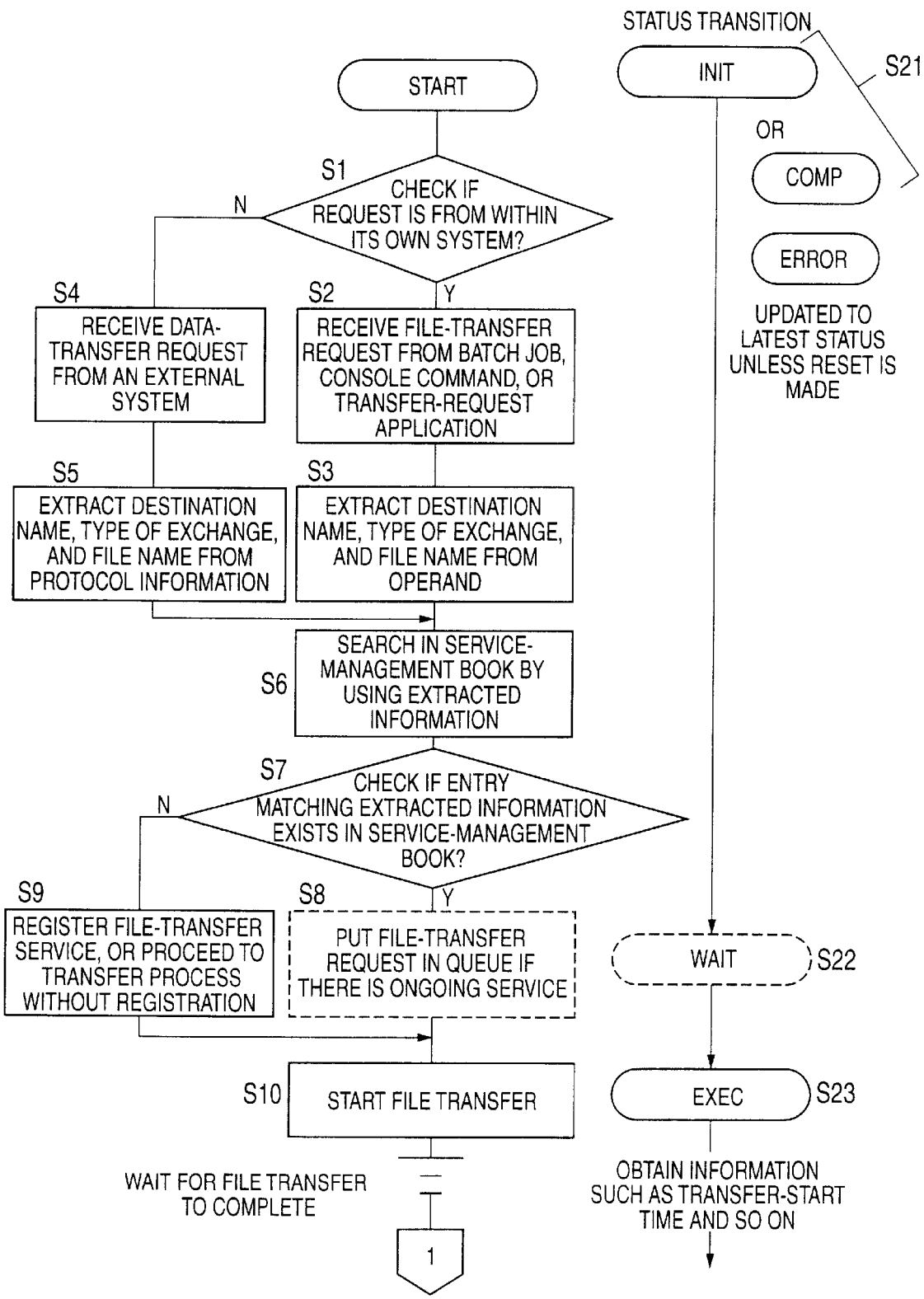
FIGS. 2A and 2B are flowcharts showing operation of a computer system shown in FIG. 1.
Figure 2B:
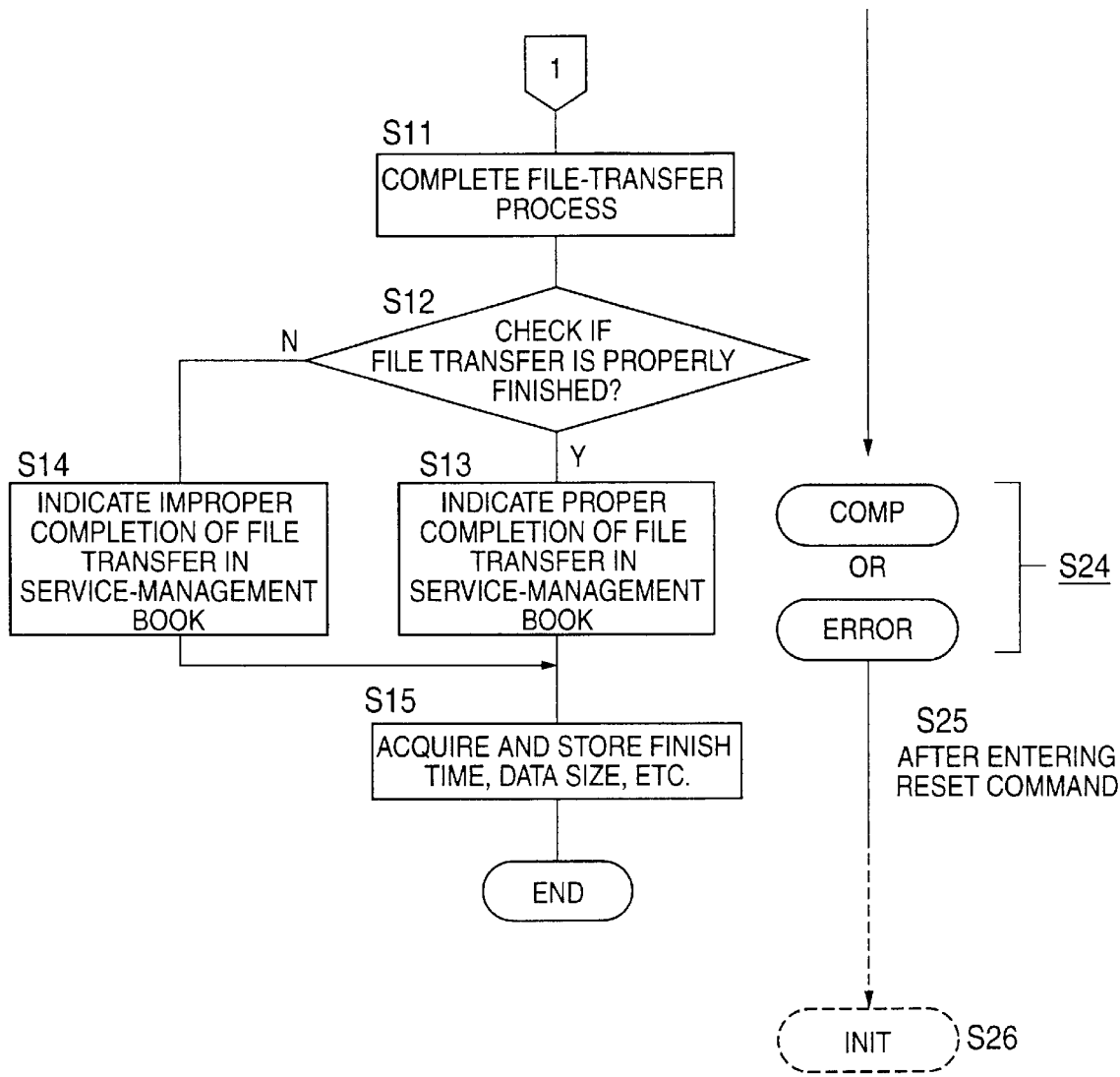

FIGS. 2A and 2B are flowcharts showing operation of the computer system 1.

In FIG. 2A, at a step S1, a check is made as to whether a request for file transfer is generated inside the computer system 1 (i.e., by the batch job 2 or the like) or sent from the partner computer system 21. If the request for file transfer is coming from inside the computer system 1, the procedure goes to a step S2.

At a step S2, the request for file transfer, which is generated by the batch job 2, the console command 3, or the transfer-request application 4, is received by the system.

At a step S3, a destination name, a type of exchange, and a file name are extracted from an operand, which is an item that specifies a type of service, and is included in the request for file transfer.

If the check at the step S1 finds that the request for file transfer is coming from the partner computer system 21, the procedure goes to a step S4, where the request for file transfer is received by the system.

At a step S5, a destination name, a type of exchange, and a file name are extracted from protocol information contained in the request for file transfer.

In this manner, the request for file transfer is received by the system, and the destination name, the type of data exchange, and the file name are extracted.

At a step S6, a search is conducted in the service-management-book unit 13 by using the extracted destination name, the type of data exchange, and the file name as search keys.

At a step S7, a check is made as to whether an entry matching the search keys exists in the service-management-book unit 13. If such an entry exists, the procedure goes to a step S8.

At the step S8, the system lapses into a waiting state after putting the request for file transfer in queue if there is an ongoing service.

If the check at the step S7 finds that there is no entry matching the search keys in the service-management-book unit 13, a file-transfer service is newly registered, or a transfer process commences without registration of the file-transfer service (non-routine business transaction).

After the steps as described above are finished in response to the request for file transfer, at a step S10, file transfer starts. If there is another file transfer process that is ongoing, completion of this ongoing file transfer process is waited for.

Then, the procedure continues to the processes shown in FIG. 2B.

In FIG. 2B, at a step S11, the file transfer process comes to an end.

At a step S12, a check is made as to whether the file transfer is properly finished.

At a step S13, if the file transfer is properly finished, an indication of proper completion of the file-transfer process (such as "COMP") is recorded in a field indicative of a processing result of a corresponding file-transfer service in the service-management-book unit 13.

If the check at the step S12 finds that the file transfer is not properly finished, at a step S14, an indication of improper completion of the file-transfer process (such as "ERROR") is recorded in the field indicative of a processing result of the corresponding file-transfer service in the service-management-book unit 13.

After the result of the file transfer is recorded in the service-management-book unit 13 as described above, a finish time, a data size, etc., of the data transfer are extracted and stored in corresponding fields of the service-management-book unit 13.

In this manner, the destination name, the type of data exchange, and the file name are extracted from the data that is generated inside the computer system 1 or the data that is received from the computer system 21 via the network, and the file transfer immediately commences if a file specified by the extracted information is an already registered item in the service-management-book unit 13 or the file transfer commences after registration of the file transfer in the service-management-book unit 13 if the file specified by the extracted information is not a registered item. After the end of file transfer, a completion status of the file transfer, which indicates a proper completion or an improper completion, is registered in the service-management-book unit 13 together with transfer information (a start time, a data size, and the like). This makes it possible to properly register such items (the destination name, the type of data exchange, and the file name) as may serve to identify a service type automatically at a time of data exchange as well as properly register processing results indicative of a file-completion status, a start/end time, a data-transfer size, etc., in the service-management-book unit 13.

In FIGS. 2A and 2B, development of status changes is shown on the right-hand side of the figures. At step S21 shown in FIG. 2A, a status is either one of an initial status INIT, a proper completion status COMP, and an improper completion status ERROR. This status will be updated to the newest status unless it is reset, as will be described below.

At a step S22, the transfer service is put in queue, and the system lapses into a waiting status WAIT.

At a step S23, when the file transfer begins at the step S10, the status becomes an execution status EXEC, during which various sets of information such as a transfer-start time is collected.

At a step S24 of FIG. 2B, when the procedure is at the step S13 or at the step S14 corresponding to the end of file transfer, the status becomes either the proper completion status COMP or the improper completion status ERROR.

At a step S25, a reset command is entered to reset the status.

At a step S26, the status is set to the initial status INIT after the reset operation.

The status changes as described above from the step S21 to the step S26 are entered in the processing-result field of the service-management-book unit 13, so that the service-management-book unit 13 keeps a record of the most current status. This allows a check to be made on the processing result of each service that is defined by the destination name, the type of data exchange, and the file name, thereby allowing a proper process (e.g., retransmission process for a service that is improperly finished) to be carried out accordingly.

FIG. 3 is a table showing an example of a data format of the service-management-book unit 13.

As shown in FIG. 3, the service-management-book unit 13 includes at least the following items for registration and management purposes.

Items for Service Search
Service ID
Group ID
Items for Specifying Service
   Name of Partner System
   Type of Exchange
   Name of File in Partner System
Items for Indicating File Transfer
Name of File in Its Own System
User ID
Password
Others
Items Indicative of Transfer Results
Processing Result (Status)
Transfer Start Time
Transfer End Time
Data Size
Others Here, the items for service search are used when searching for a specified service. For example, a service ID is specified as a search key in order to show current conditions of the specified service. A group ID (e.g., sales figures or inventory data) is specified as a search key to display current sales figures or current inventory data. The items for specifying service may be used to select a service as search conditions, thereby displaying a list of the relevant service and current conditions thereof.

The items for indicating file transfer are used for the purpose of indicating a file transfer.

The items indicative of transfer results are used to register results of file transfer, and indicate a proper/improper status of file transfer, a start/end time of file transfer, a data size of file transfer, etc.

As described above, the service-management-book unit 13 has various items registered therein, including the items for service search, the items for indicating file transfer, and the items indicative of transfer results. These items make it possible to record and search for current statues of services, allowing proper management of the services.

Figure 4:
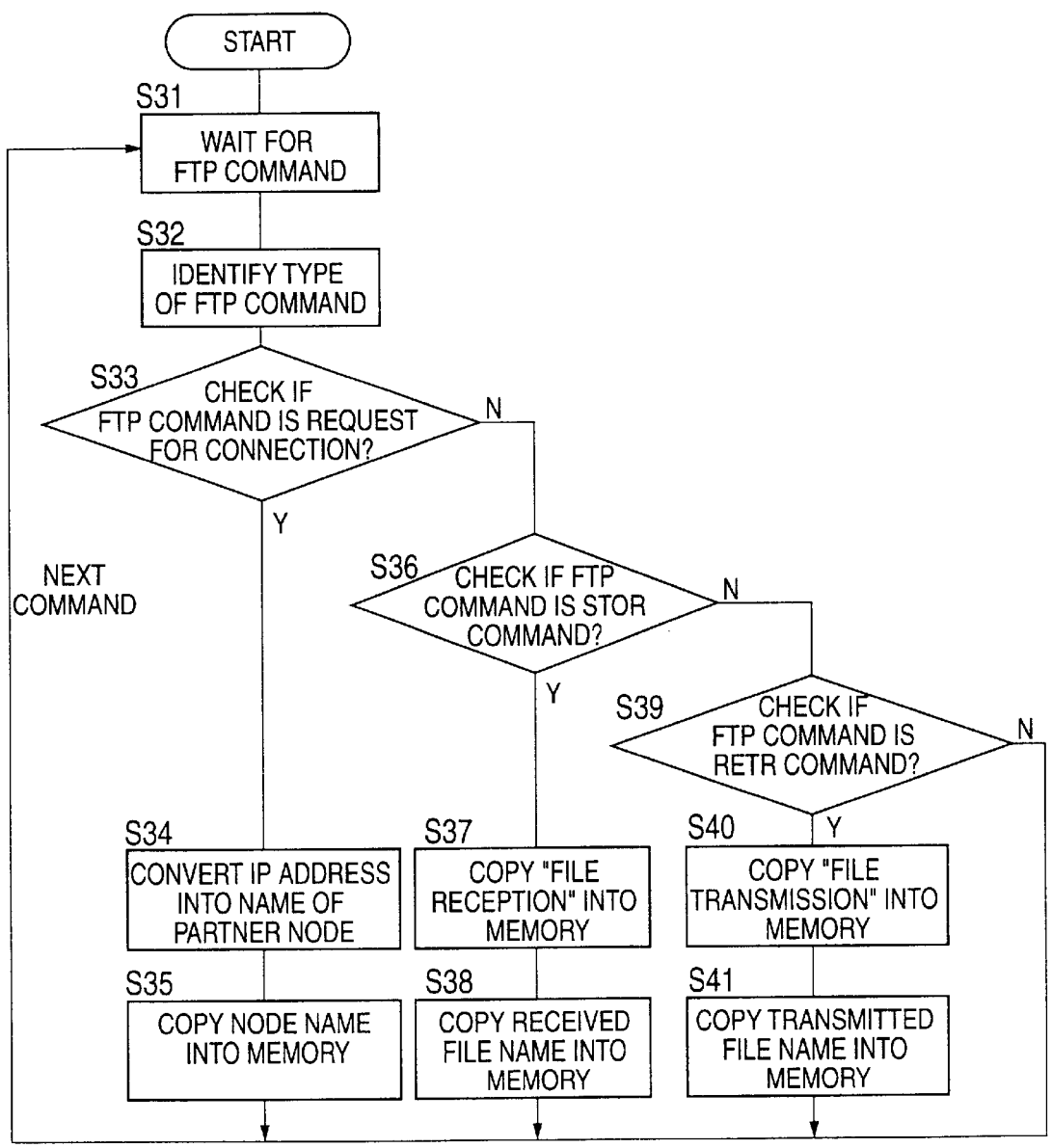
FIG. 4 is a flowchart of a process of extracting transfer history when FTP is used.

FIG. 4 is a flowchart of a process of extracting transfer history when FTP (file transfer protocol) is used.

In FIG. 4, at a step S31, the computer system 1 is initially in a waiting state to wait for an FTP command.

At a step S32, a type of an FTP command is detected upon receiving the FTP command. Detecting an FTP-command type is necessary in order to automatically extract items for specifying a service from the exchanged FTP command when exchanging data by use of TPC/IP protocols. Here, such items include a destination name, a type of exchange, and a file name.

At a step S33, a check is made as to whether the FTP command having the command type thereof being detected is a request for connection. In detail, a check is made as to whether establishment of a command connection is completed. If the FTP command is a request for connection, the procedure goes to a step S34.

At the step S34, an IP address is converted into a name of a node with which data is to be exchanged.

At a step S35, the node name is copied to a memory. Then, the procedure goes back to the step S31 to repeat the processes described above for a next command.

If the check at the step S33 finds that the FTP command is not a request for connection, the procedure goes to a step S36, at which a check is made as to whether the FTP command having the type thereof being detected is a STOR command. The STOR command will be described later in detail. If the FTP command is a STOR command, the procedure goes to a step S37.

At the step S37, a "file reception" indicative of reception of a file is copied to the memory.

At a step S38, a received file name is copied to the memory.

If the check at the step S36 finds that the FTP command is not a STOR command, the procedure goes to a step S39, at which a check is made as to whether the FTP command having the type thereof being detected is a RETR command. The RETR command will be described later. If the FTP command is a RETR command, the procedure goes to a step S40.

At the step S40, a "file transmission" indicative of transmission of a file is copied to the memory.

At a step S41, a transmitted file name is copied to the memory. Then, the procedure goes back to the step S31 to repeat the processes described above for a next command. If the check at the step S39 finds that the FTP command is not a RETR command, the procedure also returns to the step S31 to repeat the processes described above for the next command.

In this manner, when the computer system 1 exchanges data packets with the computer system 21 by use of the TCP/IP protocols, the destination name (IP address B/node name), the file name (received-file name/transmitted-file name), and the type of exchange (reception/transmission) are automatically extracted and stored in the memory. After storing these pieces of information in the memory, they can be read from the memory to be registered in the service-management-book unit 13.

Figure 5:
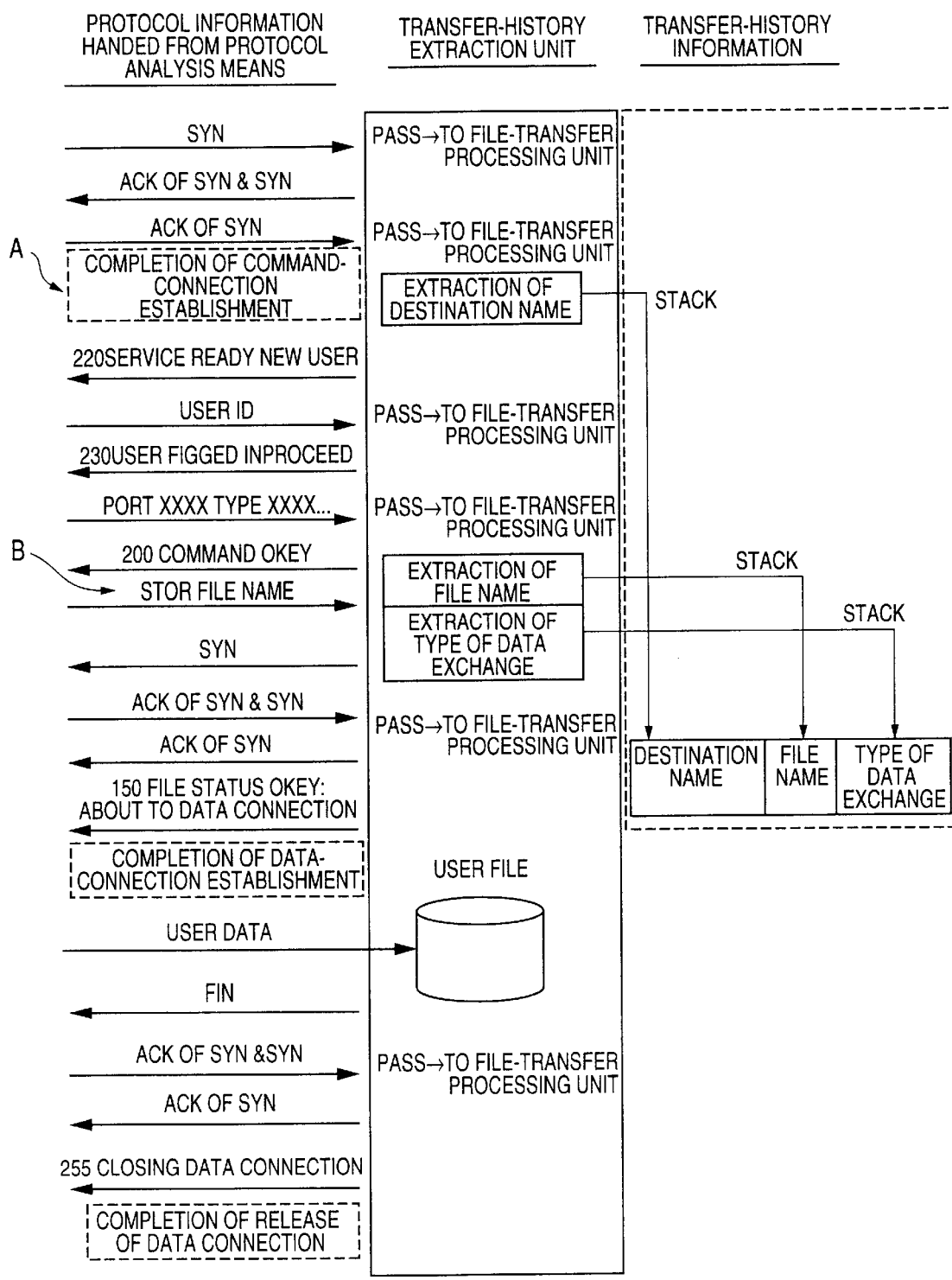
FIG. 5 is an illustrative drawing showing a flow of transfer-history-extraction operation.

FIG. 5 is an illustrative drawing showing a flow of transfer-history-extraction operation.

FIG. 5 shows the way the file-transfer history is automatically extracted from protocol analysis of an FTP command used for exchanging packets through TCP/IP protocols. Here, the file-transfer history includes a destination name, a file name, and a type of data exchange. On the left-hand side of FIG. 5 is shown protocol information that is handed from the protocol-analysis unit. At the center of FIG. 5, processes performed by the transfer-history-extraction unit 7 are shown. On the right-hand side of FIG. 5 is shown information that is stored in the transfer-history-storage memory where such information includes a destination name, a file name, and a type of data exchange.

In FIG. 5, at a time of establishment of command connection A, a destination name is extracted, and is stacked in the transfer-history-storage memory as shown on the right-hand side of the figure.

When a STOR command for setting a transmission-file name is received, the file name and the type of data exchange ("file reception") are extracted, and are stacked in the transfer-history-storage memory as shown in the figure. When a RETR command for setting a transmission-file name is received in place of the STOR command, the file name and the type of data exchange ("file transmission") are extracted, and are stacked in the transfer-history-storage memory as shown in the figure.

In this manner, information for specifying a service type such as a destination name, a file name, and a type of data exchange are automatically extracted at the time of establishment of command connection and at the time of reception of a STOR command or a RETR command.

Figure 6:
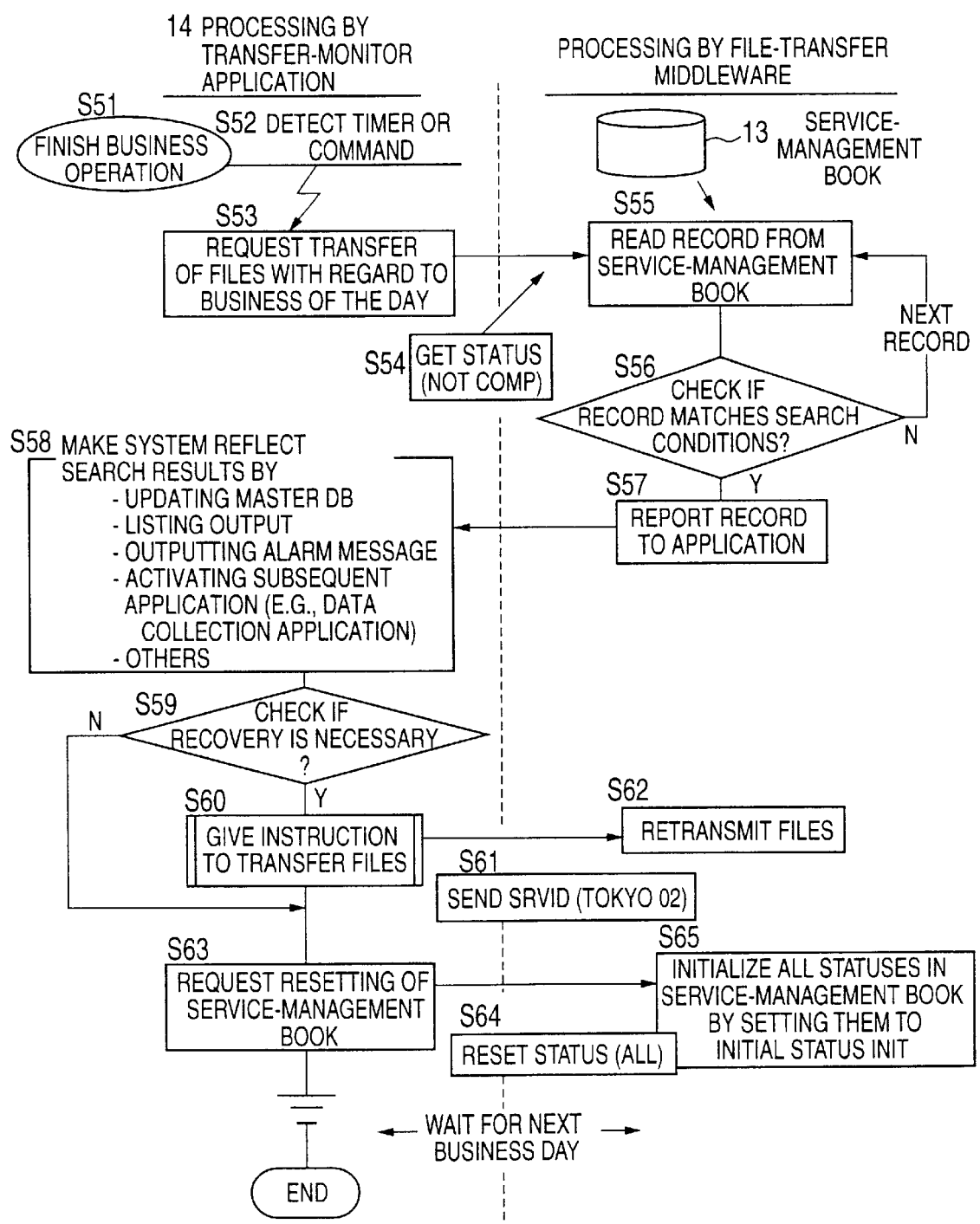
FIG. 6 is a flowchart of a search process according to the present invention.

FIG. 6 is a flowchart of a search process according to the present invention. Here, file-transfer middleware in FIG. 6 corresponds to a portion shown in FIG. 1 that is labeled as "file-transfer middleware".

In FIG. 6, at a step S51, a business operation is finished. Here, the business operation refers to a business that is conducted by the configuration of FIG. 1 such as selling of merchandise while exchanging information between the headquarter (computer system 1) and the plurality of stores (computer systems 21).

At a step S52, a timer goes off, or a command is entered by an administrator.

At a step S53, transfer of files is requested with regard to the business of the day in response to the timer or the command.

At a step S54, a command (e.g., GET STATUS (NOT COMP)) is issued in response to the request. This command requests a search for all files that show an improper file-completion status "NOT COMP" in the service-management-book unit 13, and requests transfer of files found as a result of the search.

At a step S55, having received the command, the search unit 12 of the file-transfer middleware reads a record from the service-management-book unit 13.

At a step S56, a check is made as to whether the record matches the search conditions specified by the command issued at the step S54. If the record matches the specified conditions, the procedure goes to a step S57.

At the step S57, the record is reported to the transfer-monitor application 14 by the search unit 12 of the file-transfer middleware.

If the check at the step S56 finds that the record does not match the specified conditions, the procedure goes back to the step S55 to repeat the same processes for a next record.

When a record matching the specified conditions (i.e., a record showing a status other than "COMP" in this example) is found as described above, at a step S58, the transfer-monitor application 14 makes the system reflect the result of search. For example, the result of search is reflected in the following items.

Make Master DB Reflect Result

List Output

Output Alarm Message

Activate Subsequent Application (e.g., Data Collection Application)

Others

Namely, the master DB reflects the reported record, and a list may be displayed to present information (a destination name, a type of data exchange, and a file name) about files that were not properly transferred. Further, an alarm message may be presented to call attention to files that were not properly transferred, and an application program for retransmission of a file may be activated with respect to a file that was not properly transferred.

After the processes described above are completed, at a step S59, a check is made as to whether recovery is necessary. If the recovery is necessary, the procedure goes to a step S60.

At the step S60, an instruction is given by using the transfer-request unit to transfer files that were not properly transferred. Namely, the transfer-request application 4 is activated by the transfer-monitor application 14 to request retransmission of relevant files.

If the check at the step S59 finds that there is no need for recovery, the procedure goes to a step S63, at which a request is issued to reset the service-management-book unit 13.

In accordance with the request for file transfer as described above, at a step S61, a retransmission command as follows is sent to the file-transfer middleware.

SEND SRVID (TOKYO O2)

This retransmission command means performing a service (file transfer) that is specified by the service ID "TOKYO O2". Namely, this retransmission command orders retransmission of a file where the file has a record that shows "ERROR" as a processing result, and has the service ID "TOKYO O2" in the service-management-book unit 13.

Upon receiving the retransmission command, at a step S62, the file-transfer middleware attends to file retransmission in accordance with the retransmission command. At this point of time, information is extracted as previously noted, and the relevant entry is updated in the service-management-book unit 13.

As previously described, the reset request requesting resetting of the service-management-book unit 13 is issued at the step S63. In response, at a step S64, the transfer-monitor application 14 transmits a reset command as follows to the file-transfer middleware.

RESET STATUS (ALL)

Upon receiving this reset command, at a step S65, the file-transfer middleware initializes processing results of all the records in the service-management-book unit 13 so that all the processing results have the initial status INIT.

In this manner, records are checked at the closing of the day to find whether there are records showing the "NOT COMP" status, and files are retransmitted with respect to the records that are specified by service IDs or group IDs. Thereafter, each record is initialized in the service-management-book unit 13 to prepare for business of the following day.

Figure 7:
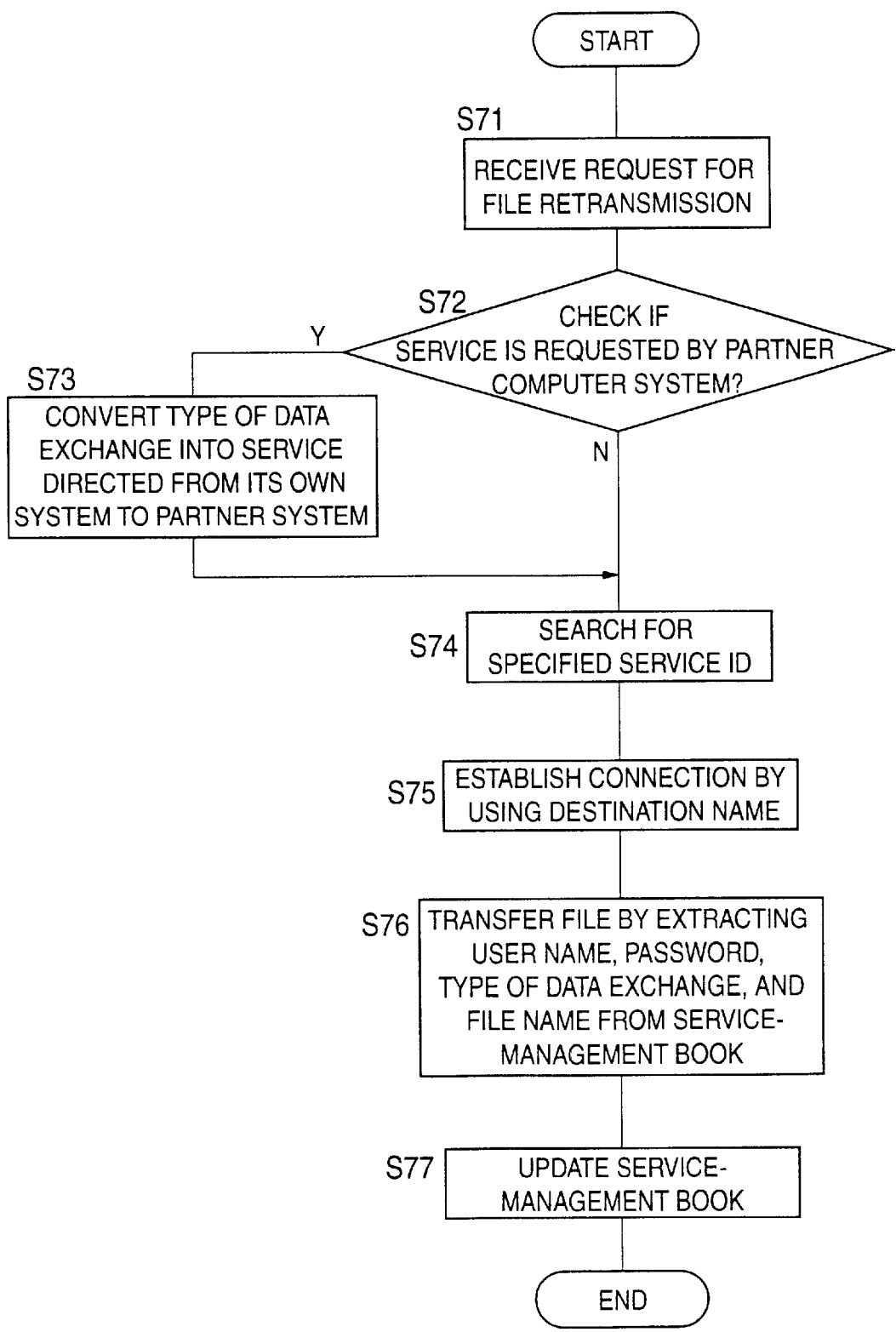
FIG. 7 is a flowchart of a retransmission process.

FIG. 7 is a flowchart of a retransmission process.

In FIG. 7, at a step s71, a request for file retransmission is received.

At a step S72, a check is made as to whether a service specified by this retransmission command is a service that is requested by the computer system 21. If it is, the procedure toes to a step S73.

At the step S73, a type of data exchange is converted into a type that indicates that the service is directed from its own system to the partner system.

If the check at the step S72 finds that the service is requested not by the partner computer system but by its own computer system, the procedure proceeds to a step S74.

At the step S74, a search for the specified service ID is conducted. Namely, a service ID of the service that is requested by the retransmission command is searched for in the service-management-book unit 13.

At a step S75, connection is established with the partner computer system by using a destination name that is found in a record of the service ID where the service ID is found as a result of the search in the service-management-book unit 13.

At a step S76, file transfer is carried out by extracting a user name, a password, a type of data exchange, and a file name from the service-management-book unit 13.

At a step S77, a result of file transfer is registered in the service-management-book unit 13 to update the service-management-book unit 13.

In this manner, a retransmission command is sent from the transfer-monitor application 14 to the file-transfer middleware, automatically resulting in a search being conducted in the service-management-book unit 13 and a relevant file being retransmitted, followed by a result of the retransmission being registered in the service-management-book unit 13.

FIG. 8 is an example of a search in the service-management-book unit 13.

As shown in FIG. 8, when records having the initial status are searched for, a command as follows is issued.

GET STATUS (INIT)

This command initiates a search for services that are not properly completed. This command is particularly useful when a totaling application cannot be executed unless files are received from all the stores.

When a search is conducted business group by business group, a command as follows is used.

GET GRPID (INVENTORY)

This command initiates a search for inventory information, sales figures, etc., and results are obtained business by business. This application is particularly useful when it is used in relation with a subsequent application.

When a search is conducted system by system with respect to the partner computer systems, a command as follows is used.

GET NODE (TOKYO, NAGOYA)

This command extracts information only about a specified computer system. This command is particularly useful when there is a delay in the business operation or when a subsequent process needs to be performed area by area.

When a search is conducted by use of a file name, a command as follows will be issued.

GET file (URIAG*) /* means a wildcard

This command is useful when a search is conducted data content by data content, e.g., when a search is directed to particular merchandise among other sales figures.

When a search is carried out by use of a type of data exchange, a command as follows will be issued.

GET KIND (#SEND) /# indicates a request from partner computer system

This command is useful when an active recovery action needs to be initiated by the computer system 1 despite a request originating from the computer system 21.

Any one of the commands described above may be used in combination with others, and two or more commands may be put together to express search conditions.

In the following, another embodiment will be described with reference to the accompanying drawings. In this embodiment, when a file is retransmitted after transmission of the file failed a first time, only the remaining data that comes after already transmitted data is transmitted by resuming data transmission from halfway through the entire transmission.

Figure 9:
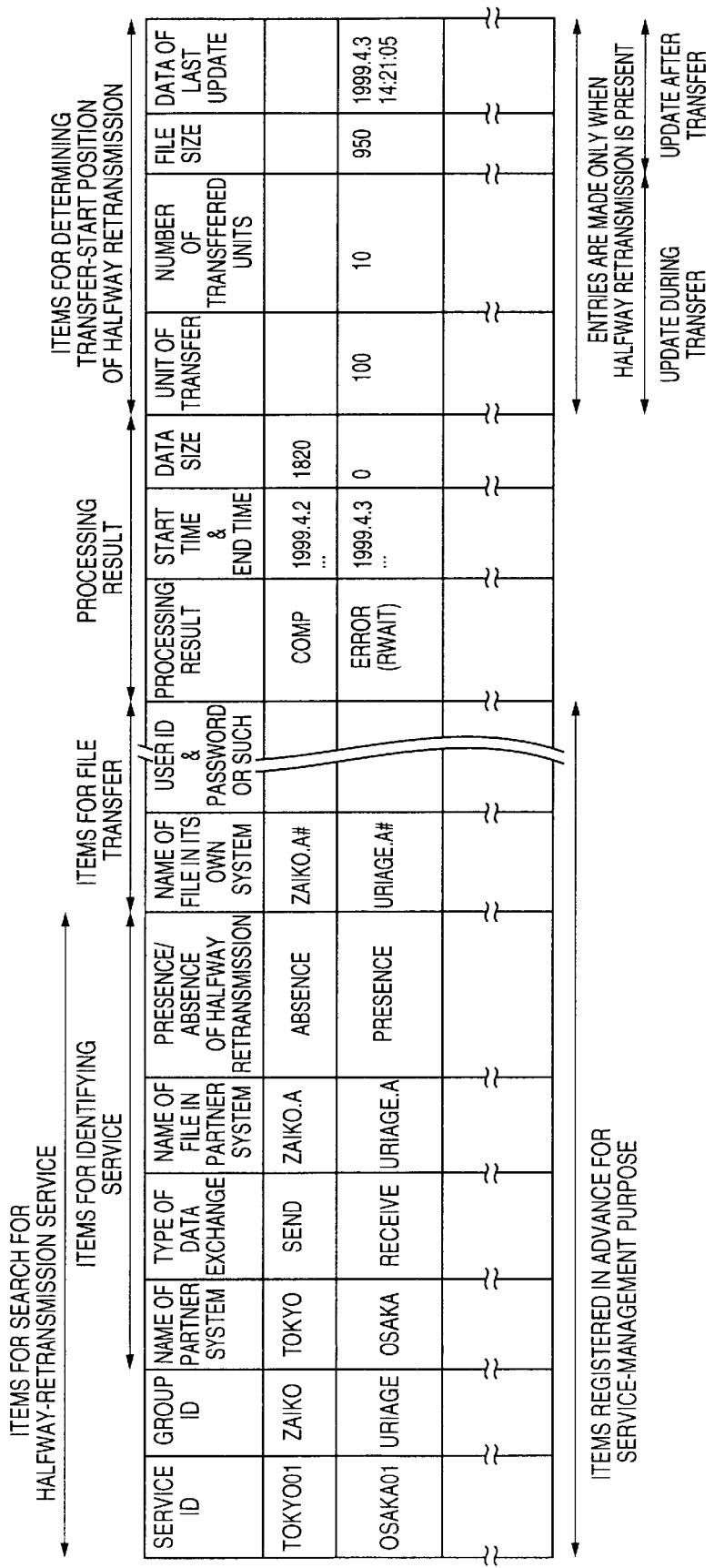
FIG. 9 is a table showing an example of another format of the service-management-book unit.

FIG. 9 is a table showing a format of the service-management-book unit 13.

As shown in FIG. 9, the service-management-book unit 13 includes items that are registered for the purpose of service management. Such items include "Service ID", "Group ID", "Name of Partner System", "Type of Data Exchange", "Name of File in Partner System", "Name of File in Its Own System", "User ID, Password", etc. Further, items that specify results of transfer include "Processing Result", "Start Time & End Time", and "Data Size". These items are the same as those found in the example of FIG. 3. In addition to the items described above, the service-management-book unit 13 further includes "presence/absence of halfway retransmission" as one of the items that need to be registered in advance for the purpose of service management. Further, the service-management-book unit 13 includes items that specify a position where retransmission of data starts. Such items include "Transfer Unit", "Number of Transferred Units", "File Size", and "Date and Time of Last Update".

The item "presence/absence of halfway retransmission" indicates whether the service provides an option of retransmission from halfway through the entire transmission. In an error-recovery process, "presence" is selected when halfway retransmission is used, and "absence" is selected when halfway retransmission is not used. The item "Transfer Unit" indicates a unit of data that is used for validating transferred data unit by unit during a file transfer process, and is represented by bytes. The item "Number of Transferred Units" indicates the amount of transferred data by a multiple of the transfer unit. The item "File Size" is the amount of data that exists as a file in its own system at a time of improper termination of the service, and is represented by bytes. The "Date and Time of Last Update" indicates a date and time when the file in its own system was updated at the time of improper termination.

The service-management-book unit 13 has records each comprised of the items described above where each record is generated with respect to each file-transfer service that is to be performed. The service (history of file transfer) is controlled and managed by using the service-management-book unit 13.

In the following, a process of file transfer and management of file-transfer service will be described.

Figure 10:
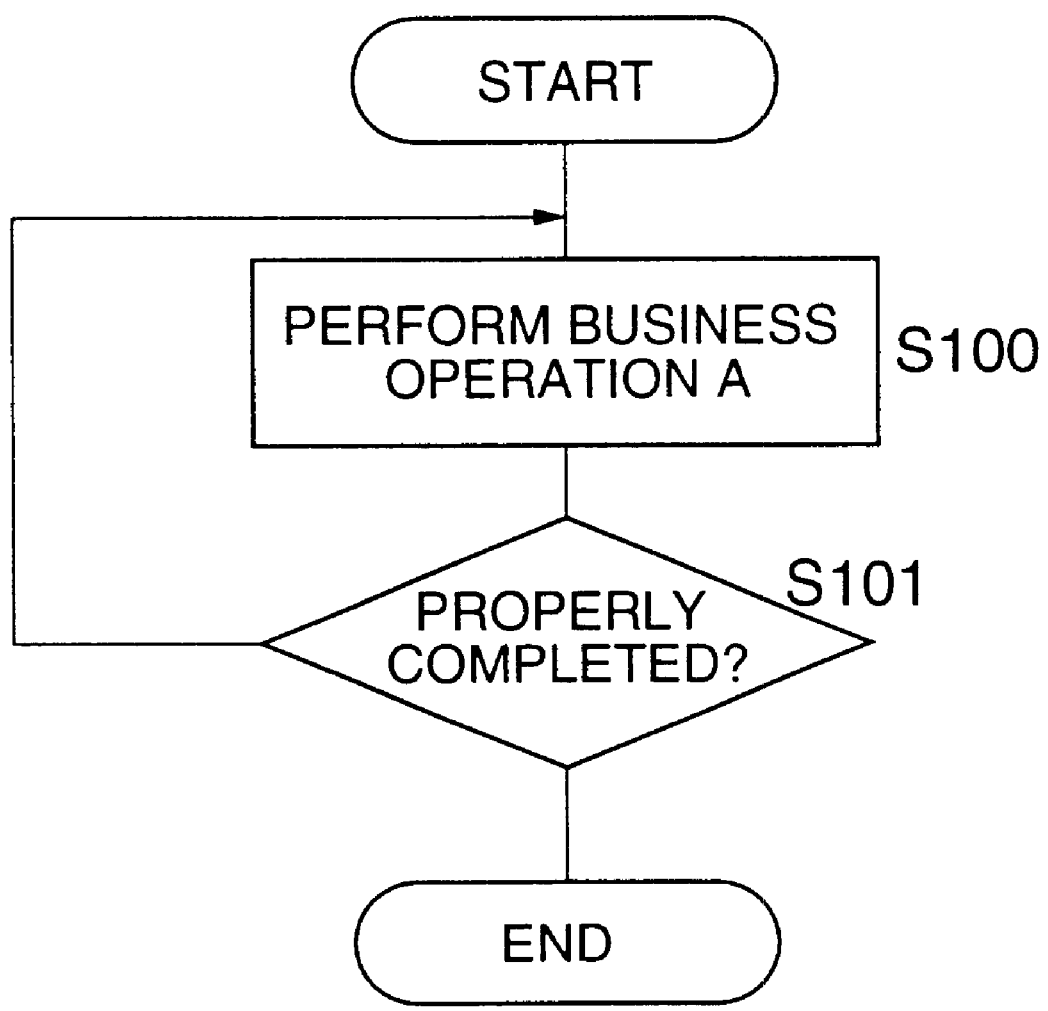
FIG. 10 is a flowchart of a process of performing a business operation.

As shown in FIG. 10, a user application executed in the computer system 1 performs a business operation A that involves file transfer.

At a step S100, the business operation A is performed.

At a step S101, a check is made as to whether the business operation A is properly completed. Thereafter, the business operation A is repeated as many times as necessary until the file transfer is properly completed.

For example, the business operation A includes three services as follows:

1. file transmission;
2. file reception; and
3. file transmission.

When the business operation A is to be performed, the user application (transfer-request application) sends a file-transfer request to the file-transfer software (file-transfer middleware) with respect to each of the service 1 (file transmission), the service 2 (file reception), and the service 3 (file transmission) listed above. Having received each file-transfer request, the file-transfer software informs the user application of processing results (proper completion/improper completion) of each requested file transfer (transmission/reception). The user application carries out the business operation A (services 1 through 3) as many times as necessary until the informed processing results indicate proper completion with respect to all the services.

Figure 11:
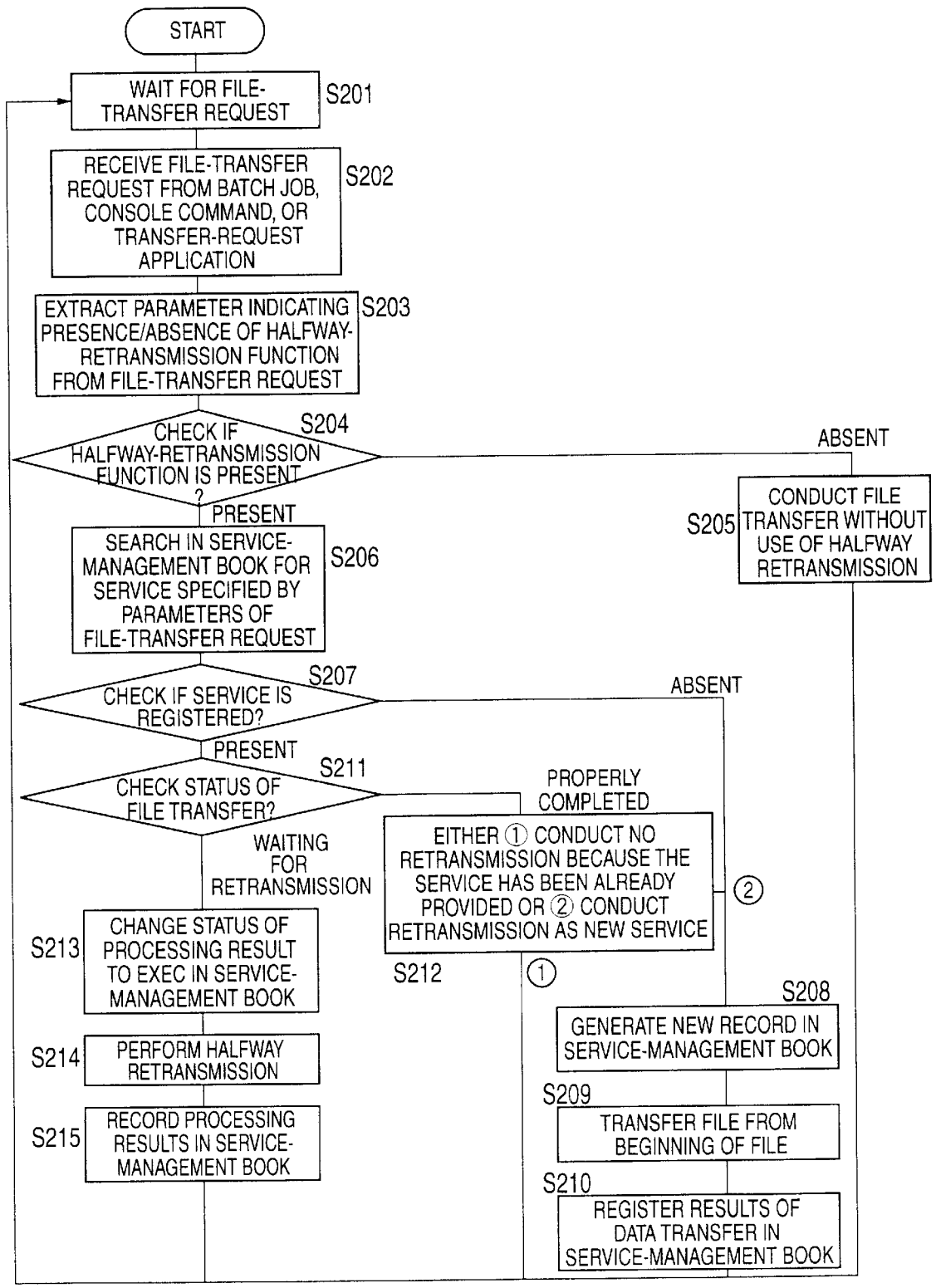
FIG. 11 is a flowchart of a process performed by file-transfer software.

FIG. 11 is a flowchart of a process performed by the file-transfer software. The process of FIG. 11 is performed, for example, during the business operation A that is carried out by the user application and the file-transfer software as described above.

In FIG. 11, at a step S201, the file-transfer software is in a waiting state to wait for a file-transfer request.

At a step S202, the file-transfer software receives a file-transfer request. The file-transfer request may come from the batch job 2, the console command 3, or the transfer-request application 4 (user application).

At a step S203, a parameter indicating presence/absence of a halfway-retransmission function is extracted from the file-transfer request, which includes various parameters such as a service ID, a group ID, a name of the partner system (i.e., destination name), a type of data exchange, a name of file in the partner system, presence/absence of a halfway-retransmission function, a name of file in its own system, a user ID, a password, etc.

At a step S204, a check is made as to whether the extracted parameter indicates presence of a halfway-retransmission function. If it does not, the procedure goes to a step S205.

At the step S205, file transfer, registration of file-transfer history, etc., will be conducted as indicated by the file-transfer request. This scenario is the same as the embodiment previously described. The file transfer and the registration of file-transfer history are performed basically in the same manner as for steps S208 through S210, which will be described later.

If the check at the step S204 finds that the extracted parameter indicates presence of a halfway-retransmission function, the procedures goes to a step S206, at which a service specified by the parameters of the file-transfer request is searched for in the service-management-book unit 13.

At a step S207, a check is made as to whether the service having a halfway-retransmission function is already registered according to the results of the search. If it is not yet registered, the procedure goes to a step S208, at which a new record is generated in the service-management-book unit 13, so that the new record includes as part of its transfer-history information the service information (parameters) that are contained in the file-transfer request.

At a step S209, data of the file is transferred (transmitted or received) by starting from the beginning of the file.

After the transfer of the file, at a step S210, results of the data transfer are stored in a record of the service in the service-management-book unit 13. When the file transfer properly succeeds, a proper-completion status (COMP) is stored in the field "Processing Result", and a start time and an ending time of the data transfer are stored in the field "Start Time & End Time", with the total amount of the transferred data being stored in the field "Data Size".

The transfer of data from the beginning of a file will be performed as shown below.

Figure 12:
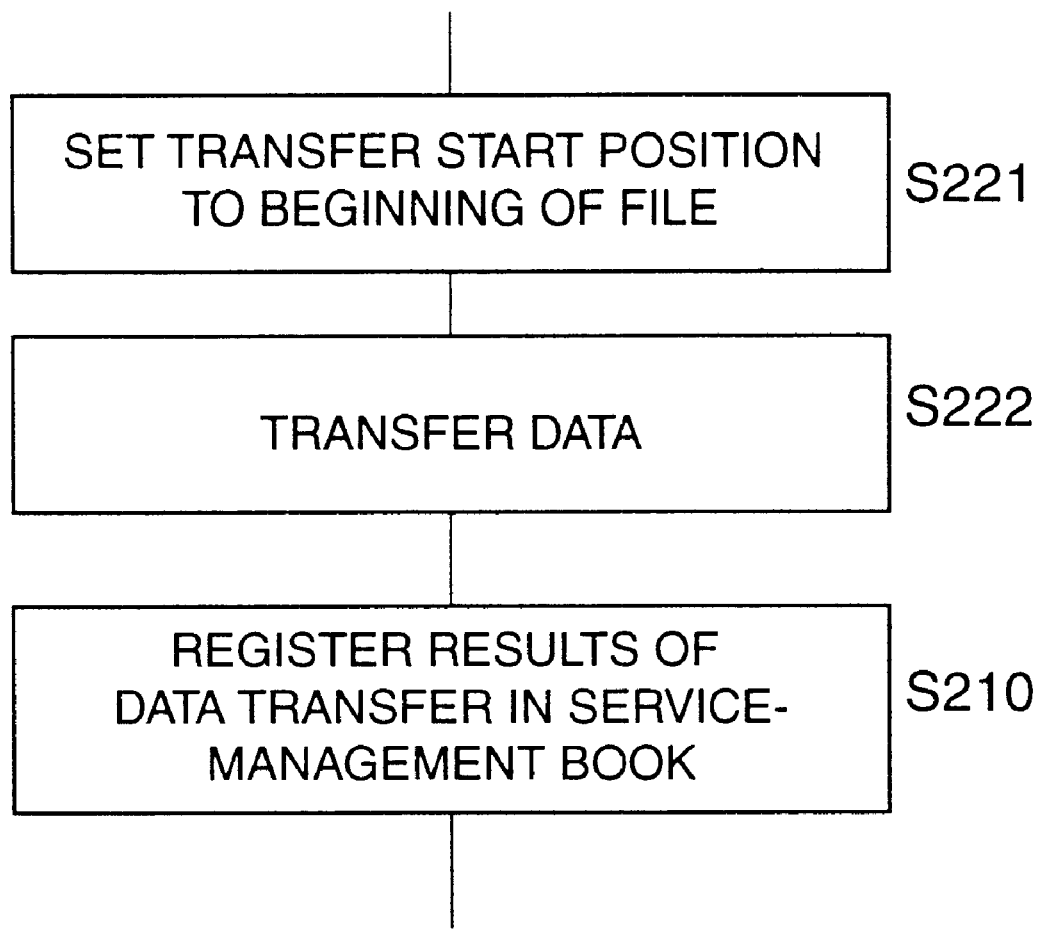
FIG. 12 is a flowchart of a process of transferring data from the beginning of a file.

FIG. 12 is a flowchart of a process of transferring data from the beginning of a file.

At a step S221, a transfer start position is set to the beginning of a file to be transferred.

At a step S222, data is transferred one after another by starting from the transfer start position.

At a step S210, results of the data transfer are registered in the service-management-book unit 13.

If the service is provided with a halfway-retransmission function, data indicative of a transfer start position needs to be registered in order to cope with a request calling for halfway retransmission. To this end, the data transfer of the step S222 will be carried out as follows.

Figure 13:
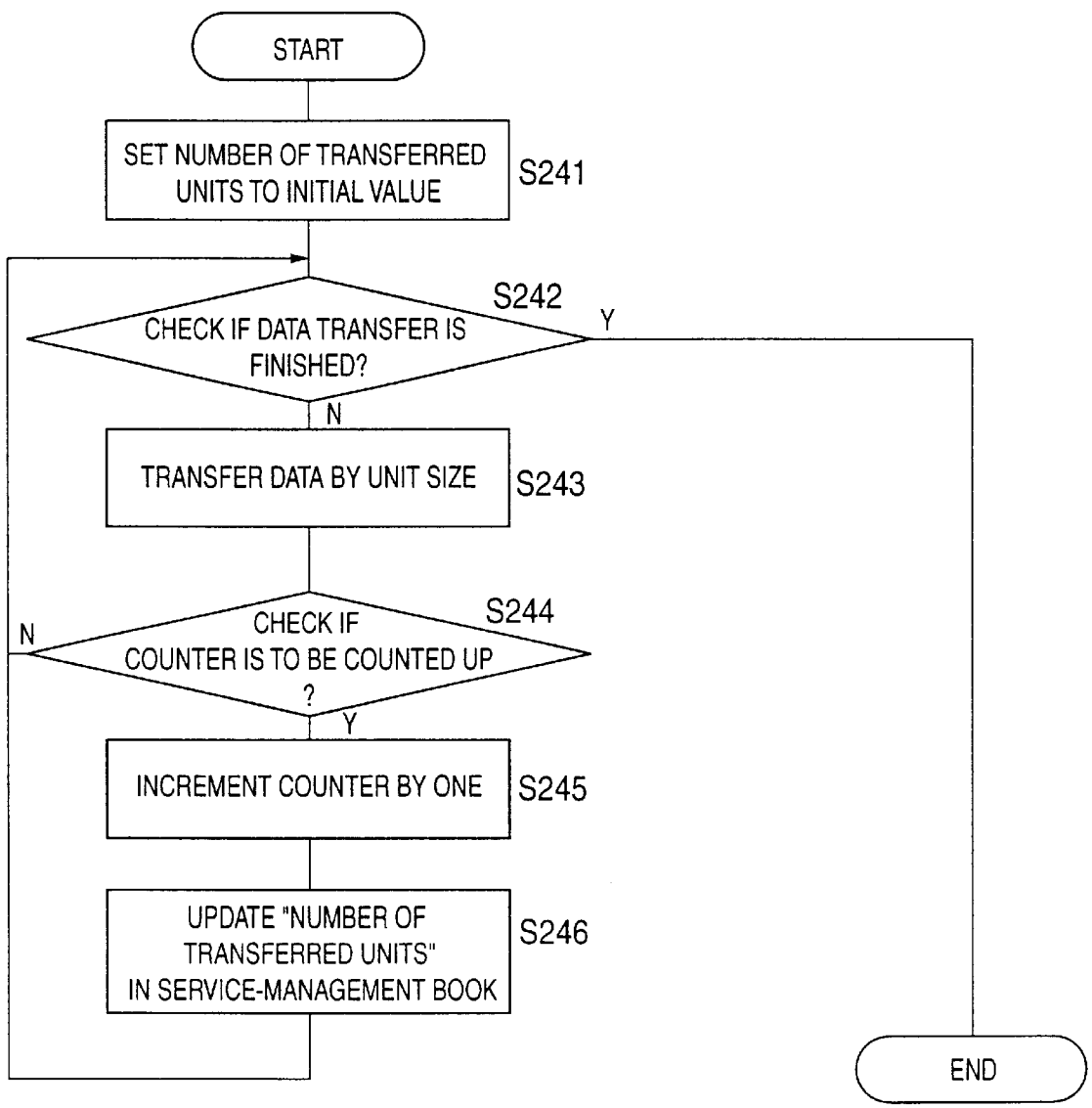
FIG. 13 is a flowchart of a data-transfer process that keeps a record of the amount of transferred data.

FIG. 13 is a flowchart of a data-transfer process that keeps a record of the amount of transferred data as data is transferred.

At a step S241, the number of transferred units is set to an initial value (e.g., zero).

At a step S242, a check is made as to whether the last of data is transferred. If the last of data is not yet transferred, the procedure goes to a step S243.

At the step S243, data of a unit size is transferred. Here, the unit size is determined by a capacity of a data buffer that is used for the data transfer.

At a step S244, a check is made as to whether data is actually transferred as much as the unit size so as to count up a counter. If it is not, the procedure goes back to the step S242 to repeat the processes described above.

If the check at the step S244 finds that data as much as the unit size is transferred, the procedure goes to a step S245, at which the counter is incremented by one.

At a step S246, "Number of Transferred Units" of the record of the service is updated to the count of the counter in the service-management-book unit 13.

Thereafter, the transfer of data and the updating of the record are repeated until the very last of the data is transferred.

If the data transfer of the step S209 shown in FIG. 11 improperly stops midway through, results of the transfer are stored in the corresponding record of the service-management-book unit 13 as follows.

A status (ERROR (RWAIT)) indicating an improper completion and a need to wait for retransmission is stored in the filed "Processing Result", and a start time and an end time of the data transfer are recorded in the field "Start Time & End Time". The field "Data Size" is set to zero. The field "Transfer Unit" has the unit data size of data transfer stored therein. Further, the field "Number of Transferred Unit" stores the updated count as described above. The item "File Size" records the amount of data stored in a file of its own system at a time of improper termination, and the item "Date of Last Update" stores a date on which the file of its own system was updated last time.

As described above, the file-transfer software attends to file-transfer operation in accordance with a file-transfer request issued by the user application, and registers transfer-history information in the service-management-book unit 13. The transfer-history information includes a service ID, a group ID, a name of the partner system, a type of data exchange, a name of a file in the partner system, presence/absence of halfway retransmission, a name of a file in its own system, a user ID, a password, a result of processing, a start/end time of data transfer, a data size, a transfer unit, a count of transferred units, a file size, a date of last update, etc. The file-transfer software informs the user application of processing results that are obtained with respect to each file-transfer service. For example, processing results may be as follows.

Service 1: COMP (proper completion)
Service 2: ERROR (RWAIT) (improper completion)
Service 3: ERROR (RWAIT) (improper completion)

In such a case, the user application sends a file-transfer request to the file-transfer software with respect to each of the services 1 through 3 because none of these services finished properly.

Upon receiving the file-transfer request for the service 1, for example, the file-transfer software performs processes of the steps S201 through S207 of FIG. 11. Since service information about the service 1 is already registered in the service-management-book unit 13, a check is made at the step S211 as to whether the processing result of the file-transfer service shows a status of a proper completion or a status of an improper completion requiring retransmission. As described above, the service 1 has been properly completed with the status "COMP", at a step S212, either no retransmission is conducted because the service has been already provided or retransmission is conducted as a service to a new request. In this example, no retransmission is performed. If the file transfer is conducted as a service to a new request, the steps S208 through S210 will be performed.

When the file-transfer request for the service 2 is received, the steps S201 through S207 and the step S211 are performed. Since the service 2 shows a status of an improper completion indicative of a waiting state to wait for retransmission (ERROR(RWAIT)), halfway retransmission will be conducted.

In the following, details of halfway retransmission will be described.

At a step S213, in a record corresponding to the service 2 in the service-management-book unit 13, the entry "Processing Result" is changed from ERROR(RWAIT) to EXEC indicating that a service is now underway. Such an entry change is shown in FIGS. 15A and 15B. Then, at a step S214, the halfway retransmission is carried out.

Figure 14:
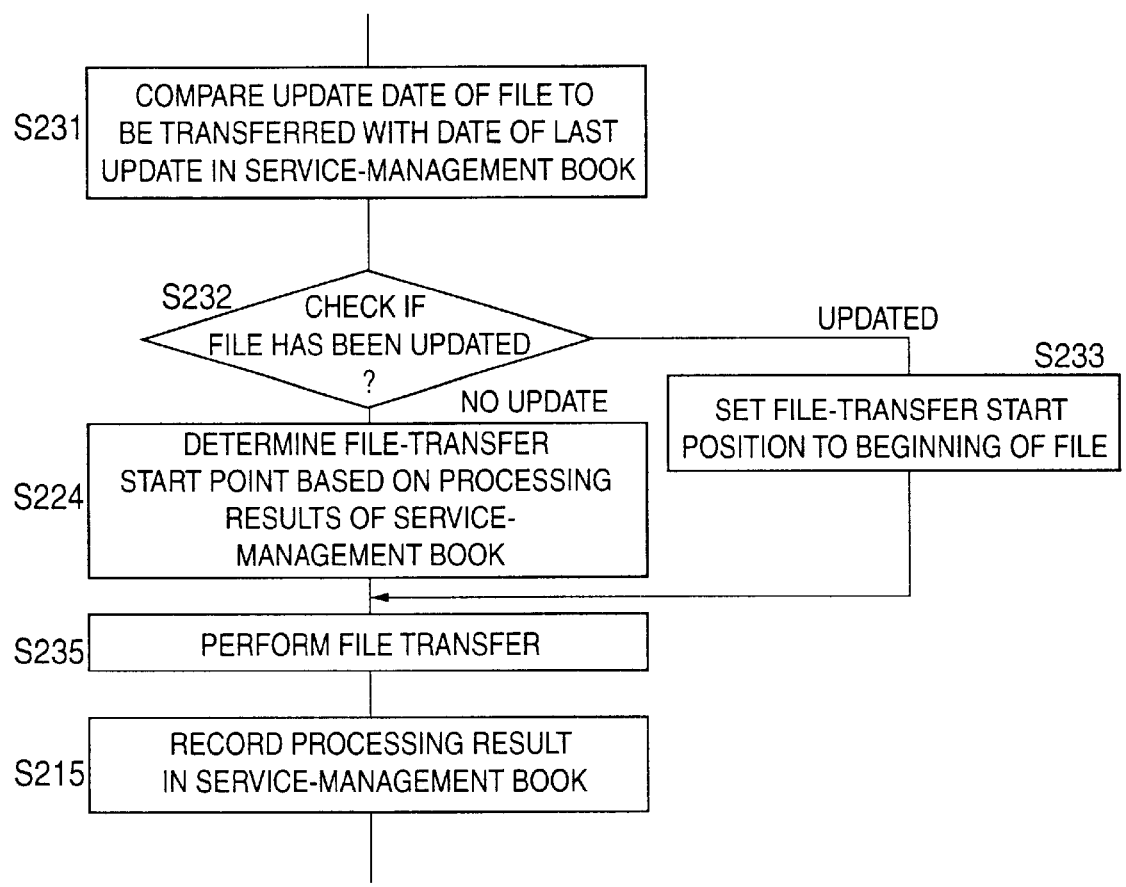
FIG. 14 is a flowchart of a halfway retransmission process.

FIG. 14 is a flowchart of a halfway retransmission process.

At a step S231, a comparison is made between a date of file update of a file to be transferred and a date of the entry "Date of Last Update" in the record of the service 2 in the service-management-book unit 13, thereby checking at a step S232 whether the file has been updated since an improper completion of the previous file transfer. If the file has not been updated, the procedure goes to a step S234.

At the step S234, a file-transfer start point is determined in preparation for retransmission of data from the data immediately following the last of the already transferred data. Here, the file-transfer start point is determined based on the contents of the items "Transfer Unit", "Number of Transferred Units", and "File Size" stored in the record of the service 2 in the service-management-book unit 13.

After the start point is determined, at a step S235, transfer of data starts from the start point, and continues successively. The transfer of data is carried out while checking the amount of transferred data in accordance with the procedure of FIG. 14.

FIGS. 15A through 15E are tables showing the way the entries of a service record are updated. As shown, the entry "Number of Transferred Units" is changed from FIG. 15B to FIG. 15C.

After the completion of the data transfer, at a step S215 (shown in FIG. 11 and FIG. 14), the result of processing is recorded in the record of the service 2 in the service-management-book unit 13.

If the data transfer completed properly, COMP is stored in the entry "Processing Result" as shown in FIG. 15D. Further, as shown in FIG. 15D, the entry "Start Time & End Time" has a start time and end time stored therein, and the entry "Data Size" has the amount of transferred data stored therein. If the data transfer completed improperly, as shown in FIG. 15E, ERROR(RWAIT) is stored as the entry "Processing Result". Further, as shown in FIG. 15E, the entries "Start Time & End Time", "Transfer Unit", "Number of Transferred Units", and "File Size" have respective data stored therein providing information on the amount of transferred data, and, also, a date of last update is recorded in the entry "Date of Last Update".

Thereafter, as the file-transfer request for the service 3 is received, the steps S201 through S207 and the step S211 will be performed. Since the service 3 exhibits a status of improper completion and a waiting state to wait for retransmission (ERROR(RWAIT)), a halfway retransmission process will be performed.

During the halfway retransmission process as preciously described (see FIG. 14), the check at the step S232 finds that the file to be transferred has been updated since the improper completion of a previous file transfer attempt. Since halfway retransmission is inappropriate in this case, at a step S233, a file-transfer start position is set at the beginning of the file. Then, at the step S235, data transfer starts from the beginning of the file. After the data transfer, results of processing are recorded in the service-management-book unit 13.

The user application finishes the business operation A when receiving a report from the file-transfer software informing of a proper completion of the file transfer.

In this manner, when recovery processing is conducted in regard to a failed transfer service, retransmission of data does not have to start from the beginning of the file but can start from the data immediately following the last of the already transferred data. This makes it possible to finish the recovery processing in a short time period.

The process described above is performed by the computer system 1 which issues a transfer request. In this file transfer service, the computer system 21 will follow a procedure as described below.

Figure 16:
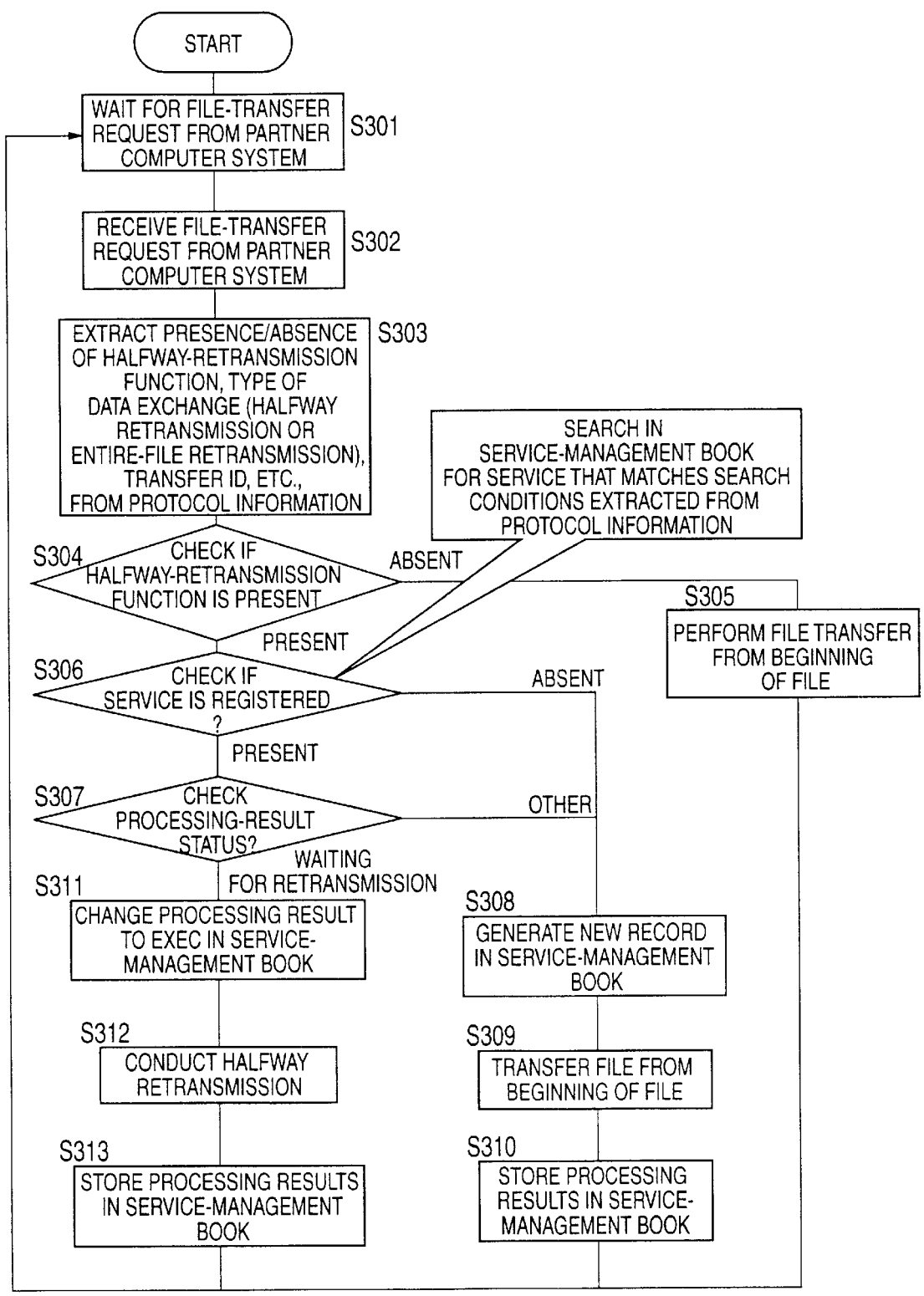
FIG. 16 is a flowchart of a process performed by a partner computer system shown in FIG. 1.

FIG. 16 is a flowchart of a process performed by the computer system 21.

In FIG. 16, at a step S301, file-transfer software of the computer system 21 is in a waiting state to wait for a file-transfer request from the computer system 1.

At a step S302, the file-transfer software receives a file-transfer request before the file-transfer process actually begins at the computer system 1.

At a step S303, presence/absence of a halfway-retransmission function, a type of data exchange (i.e., either halfway retransmission or retransmission from the beginning of a file), and a transfer ID are extracted from the protocols information included in the file-transfer request.

At a step S304, a check is made as to whether a halfway-retransmission function is present. If it is not, the procedure goes to a step S305, at which file-transfer operation starts from the beginning of the file as a process of new file transfer. The file transfer process is a file reception process to receive the file from the computer system 1 if the transfer request calls for reception of a file. If the transfer request calls for transmission of a file, the file transfer process is a file transmission process to transmit a requested file.

If the check at the step S304 finds that a halfway-retransmission function is present, the procedures goes to a step S306, at which a check is made as to whether a service specified by the information extracted from the file-transfer request is a registered service in the service-management-book unit 13. If it is not a registered service, the procedure goes to a step S308, at which a new record is generated in the service-management-book unit 13, so that the new record includes as part of its transfer-history information the service information that are contained in the protocol information of the file-transfer request.

At a step S309, data of the file is transferred (transmitted or received) by starting from the beginning of the file (see FIG. 12 and FIG. 13).

After the transfer of the file, at a step S310, results of the data transfer are stored in a record of the service in the service-management-book unit 13 where the results of the data transfer includes a proper completion, a start/end time, a data size, an improper completion, a transfer unit, the number of transferred units, a file size, and a date of last update.

If the check at the step S306 finds that the service is a registered service in the service-management-book unit 13, a check is made at a step S307 as to the processing-result status of the service. If the status indicates an improper completion and a waiting state to wait for retransmission (ERROR(RWAIT)), at a step S331, the entry "Processing Result" in the record of the service is changed to EXEC in the service-management-book unit 13.

At a step S312, halfway retransmission is conducted. During the halfway retransmission, if the transfer request is a request for reception, the computer system 21 receives data one after another from the computer system 1 as the computer system 1 sends the data after another by starting halfway through the file. If the transfer request is a request for transmission, the computer system 21 sends data one after another to the computer system 1 by starting halfway through the file at a transfer-start position (as is determined at the step S224 of FIG. 14) that is reported by the computer system 1.

After the completion of the retransfer process, at a step S313, results of the data transfer such as a proper completion, a start/end time, a data size, an improper completion, a transfer unit, the number of transferred units, a file size, and a date of last update are stored in the record of the service provided in the service-management-book unit 13.

In this manner, the computer system 21 which receives a transfer request attends to file transfer operation, resulting in the transfer-history information being stored in the service-management-book unit 13 in both the computer system 1 issuing the request for transfer service and the computer system 21 receiving the request for transfer service.

Further, the present invention is not limited to these embodiments, but various variations and modifications may be made without departing from the scope of the present invention.

The present application is based on Japanese priority application No. 2000-042060 filed on Feb. 18, 2000 with the Japanese Patent Office, the entire contents of which are hereby incorporated by reference.

What is claimed is:

1. A device for collecting history of data transfers, comprising:
   a transfer-history-extraction unit which extracts transfer-history information from data subjected to data transfer each time the data transfer is performed, the extracted transfer-history information being separate from the data subjected to data transfer;
   a service-management book; and
   a service-management unit which newly registers the extracted transfer-history information in the service-management book if transfer-history information about said data transfer is not yet registered in the service-management book, and stores a processing result indicative of either a proper completion of the data transfer or an improper completion of the data transfer together with the extracted transfer-history information registered in the service-management book, whereby said service-management book stores the processing result for each of said data transfers.

2. The device as claimed in claim 1, wherein the data subjected to data transfer includes data to be transferred from said device to another device connected thereto.

3. The device as claimed in claim 1, wherein the data subjected to data transfer includes data to be transferred to said device from another device connected thereto.

4. The device as claimed in claim 1, wherein said service-management unit registers the transfer-history information about a given data transfer in the service-management book if the transfer-history information about the given data transfer is not registered in the service-management book.

5. The device as claimed in claim 1, further comprising:
   a search unit, wherein the transfer-history information includes a destination, a type of data transfer, and a file name, which have a group ID attached thereto, and said search unit searches in the transfer-history information for an entry having a specified group ID when a search request is made with the specified group ID.

6. The device as claimed in claim 1, further comprising:
   a search unit which searches in the transfer-history information for an entry having a specified file name when a search request is made with the specified file name.

7. The device as claimed in claim 6, wherein a request for retransmission is made when the specified processing result indicates the improper completion of the data transfer.

8. The device as claimed in claim 1, further comprising:
   a search unit which searches in the transfer-history information for an entry stored together with a specified processing result when a search request is made with the specified processing result.

9. A computer-readable medium having a program embodied therein for causing a computer to collect history of data transfers, said program comprising:
   a transfer-history-extraction unit which extracts transfer-history information from data subjected to data transfer each time the data transfer is performed, the extracted transfer-history information being separate from the data subjected to data transfer;
   a service-management book; and
   a service-management unit which newly registers the extracted transfer-history information in the service-management book if transfer-history information about said data transfer is not yet registered in the service-management book, and stores a processing result indicative of either a proper completion of the data transfer or an improper completion of the data transfer together with the extracted transfer-history information registered in the service-management book, whereby said service-management book stores the processing result for each of said data transfers.

10. The computer-readable medium as claimed in claim 9, wherein the data subjected to data transfer includes data to be transferred from said computer to another computer connected thereto.

11. The computer-readable medium as claimed in claim 9, wherein the data subjected to data transfer includes data to be transferred to said computer from another computer connected thereto.

12. A system for managing history of data transfers, comprising:
   a data-storage unit;
   a transfer-history obtaining unit which obtains transfer-history information each time a data transfer service is performed to transfer a file, the transfer-history information identifying the data-transfer service, the obtained transfer-history information being separate from data subjected to the data-transfer service;
   a service-management book; and
   a service-management unit which newly registers the obtained transfer-history information in the service-management book if transfer-history information about said data-transfer service is not yet registered in the service-management book, and stores, in said data-storage unit, a processing result indicative of either a proper completion of the data-transfer service or an improper completion of the data-transfer service together with the obtained transfer-history information registered in the service-management book, whereby said service-management book stores the processing result for each of said data-transfer services.

13. The system as claimed in claim 12, wherein the processing result includes information indicative of data that was not transferred within the file because of the improper completion of the data-transfer service.

14. The system as claimed in claim 13, wherein the information indicative of the data that was not transferred within the file identifies the data that was not transferred within the file by identifying data that was successfully transferred within the file.

15. The system as claimed in claim 13, wherein the processing result further includes a date and time of a last update with regard to the file.

16. The system as claimed in claim 12, wherein the transfer-history information includes information indicative of whether an operation of data retransmission that resumes data transfer from halfway through the data-transfer service is available, and, if the operation is indicated to be available, the processing result includes information indicative of data that was not transferred within the file because of an improper completion of the data-transfer service.

17. The system as claimed in claim 12, further comprising:

first check means for checking if the transfer-history information includes an entry of a requested service when the requested service is requested;

second check means for checking whether the processing result associated with the entry of the requested service indicates the improper completion of data transfer; and data-transfer processing means for performing data transfer of the requested service if said second check means finds that the requested service improperly completed.

18. The system as claimed in claim 17, wherein the processing result includes information indicative of data that was not transferred within the file, and said data-transfer processing means transfers the data that was not transferred within the file when said second check means finds that the requested service improperly completed.

19. The system as claimed in claim 17, wherein the processing result includes information indicative of a date and time at which the requested service improperly completed, and said data-transfer processing means transfers an entirety of the file if the file to be transferred was updated since the indicated date and time.

20. A computer-readable medium having a program embodied therein for causing a computer to manage history of data transfers, said program comprising:

a transfer-history obtaining unit configured to obtain transfer-history information each time a data transfer service is performed to transfer a file, the transfer-history information identifying the data-transfer service, the obtained transfer-history information being separate from data subjected to the data transfer service;

a service-management book; and a service-management unit configured to newly register the obtained transfer-history information in the service-management book if transfer-history information about said data transfer service is not yet registered in the service-management book, and to store, in a memory storage, a processing result indicative of either a proper completion of the data-transfer service or an improper completion of the data-transfer service together with the obtained transfer-history information registered in the service-management book, whereby said service-management book stores the processing result for each of said data transfer services.

21. The computer-readable medium as claimed in claim 20, further comprising:

a first check unit configured to check if the transfer-history information includes an entry of a requested service when the requested service is requested;

a second check unit configured to check whether the processing result associated with the entry of the requested service indicates the improper completion of data transfer; and a data-transfer unit configured to perform data transfer of the requested service if said second check unit finds that the requested service improperly completed.

* * * * *